UNITED STATES PATENT OFFICE.

FELIX RICHTER, OF FRANKFORT-ON-THE-MAIN, GERMANY.

PROCESS FOR MANUFACTURING A SUBSTANCE FOR PURIFYING WASTE WATER AND FOR DRAINING SLUDGE.

1,133,446.  Specification of Letters Patent. Patented Mar. 30, 1915.

No Drawing.   Application filed June 3, 1912. Serial No. 701,324.

*To all whom it may concern:*

Be it known that I, FELIX RICHTER, a citizen of the German Empire, residing at Frankfort-on-the-Main, in Hesse-Nassau, Prussia, Germany, have invented certain new and useful Improvements in Processes for Manufacturing a Substance for Purifying Waste Water and for Draining Sludge, of which the following is a specification.

Purification of waste water of many kinds, more particularly that from paper mills, tan-yards, wool-washing works and slaughter houses, offers great difficulties.

This invention has for its object to remove those difficulties, and attains its object by treating the waste water in question and other waste water, or waste water sludge, with a silicic acid material of a special kind. This material is obtained by treating minerals containing silicic acid, preferably aluminium silicates, and more particularly clay after calcination of same with exclusion of air, with acids and water, in such a manner that the silicic acid of the raw material is converted into a hydrated gelatin-like or slimy or soluble form. This result is obtained if, during the treatment, only a limited quantity of water is added, as otherwise, when the quantity of water supplied is increased beyond a certain amount, large quantities of silicic acid or of compounds containing silicic acid, are precipitated in the form of sand. If silicic-acid-containing material, especially clay after calcination with exclusion of air, is treated with suitable acids, more particularly with sulfuric acid, it is very easily and quickly decomposed and results in a specially good purifying preparations provided that the process is carried through with a suitable limitation of the water present in the reaction.

In treating clay with sulfuric acid, silicic acid material is produced together with aluminium sulfate, iron sulfate and other compounds which, if desired, can be separated from the slimy mass containing silicic acid. In the majority of cases, however, it is advantageous to leave in the mass the sulfates and other by-products obtained by the treatment of clay with acid, as the mass is then more efficient. The material obtained by the treatment of clay calcined with exclusion of air, or of other suitable minerals containing silicic acid, with acid with limited addition of water, is preferably added directly by means of an energetic mixing device, in suitable proportion, to the liquid to be purified in the conduit supplying the latter, so that the purifying substance is quickly and uniformly distributed throughout the entire body of the liquid to be purified. Usually the effect of the purifying means is increased if the waste water has an alkaline reaction, as experience has shown in many waste waters. It is therefore advisable as a rule to bring about an alkaline reaction in the water or mud to be purified.

The process to be followed in the manufacture of the silicic acid material to be used according to this invention for clarifying purposes, and in its use for instance for purifying waste water from paper or cardboard materials, may be as follows: To each kilogram of clay or kaolin calcined with exclusion of air are added about 400 grms. of sulfuric acid of 66° B. and 1500 grms. of water, preferably in several portions, for instance, first, 200 grms. of acid and 200 grms. of water, and then again 200 grms. of acid and 400 grms. of water. These ingredients are left for about 20 minutes without heating to act on each other, a spontaneous heating to a temperature of 80–100° C. then taking place. The temperature of the mixture is then maintained for about an hour at about 65–90° C., preferably in a water bath, and another 900 grms. of water are very gradually added, with frequent stirring. According to the nature of the clay, it is sufficient after completing the addition of solvents, to maintain the temperature for 30–60 minutes, in order to decompose the mass of clay to such an extent that the silicic acid contained therein, takes the gelatinous or slimy nature required for the purpose of use, a very small per centage or none at all, of the silicic acid being precipitated in the form of sand.

In waste water from cardboard mills, of the usual composition, it is sufficient, according to the degree of purification desired, to use 1–1½ kg. of silicic acid substance for purifying 1 cubic meter of waste water. The waste water mixed with silicic acid slime, can be introduced directly into an automatic slime separator of well known construction, for instance into a Kremer apparatus, in which the slime is separated within about 10–15 minutes, while the purified water escapes constantly in a clear state.

The slime can be again brought directly into the manufacture, as the slight quantity of silicic acid added is harmless.

If it is desired to obtain the purifying material not in the form of slime, but in a dry form, this can be easily done by first adding only the necessary quantity of acid, and thereupon the water, in such quantity as to bring about the highest possible temperature of reaction, under the action of which the mass in cooling takes a solid shape. By grinding this solid product of reaction, the purifying material is obtained in the form of a powder. This process has the advantage that the purifying material can be shipped in a more convenient manner and at a less expense.

The thorough limitation of the addition of water in the manufacture of the purifying product, has for its result that there is a greater independence of the reliability of the attendants during the carrying out of the process, as there is less danger of a precipitation of the silicic acid in the form of sand, owing to the prescribed quantity of the water to be added being exceeded.

For the purpose of obtaining the purifying product in solid shape, the following process may be followed. Clay calcined with exclusion of air and intended to be used as raw material for the purifying preparation, is placed in a crushing mill and 20-25 kg. of highly concentrated sulfuric acid are added for each 50 kg., the clay and acid being thoroughly worked together by starting the crusher. After mixing for about 15-30 minutes, about 18-20 kg. of water preferably heated are added for each 50 kg. of clay mixed with sulfuric acid, as the highest possible temperature of reaction is necessary for obtaining a dry final product. While the addition of sulfuric acid produces only a slight rise of temperature, the addition of the above mentioned limited quantity of water results in a very considerable increase of temperature which rises to 120° or 130° C. After the addition of water, the crusher is allowed to run for another few minutes, whereupon the mass is left to stand, until the sulfuric acid is absorbed. During the subsequent cooling, the mass solidifies. The solid product can be easily ground to powder and can be shipped in that shape, and added directly to the waste water or sludge to be purified.

It has been found advisable, especially in those cases in which an iron-containing raw material is used, to add to the mass, after the end of the sulfuric acid reaction, hydrochloric acid in quantities which are small compared to the quantity of the sulfuric acid added, for instance 1½-2 kg. of hydrochloric acid for each 50 kg. of clay. The product obtained in that case, shows a considerably increased purifying action, which, in certain kinds of waste water, is so great that 200 gr. of purifying product obtained with the use of hydrochloric acid, showed the same purifying action as 250 gr. of the product obtained with sulfuric acid and water only. The addition of hydrochloric acid is also advisable in cases in which the addition of water in the reaction is not limited to such an extent as to give a dry product.

What I claim is:—

1. The process of treating silicates for the manufacture of purifying-agents, which consists in calcining and then reacting thereon with sulfuric and hydrochloric acids in presence of limited proportions of water, and regulating the temperature so as to obtain substantially all of the silicate in the hydrated or water-soluble form.

2. The process of treating silicates for the manufacture of purifying-agents, which consists in calcining the silicate with exclusion of air, reacting on the calcined product with sulfuric acid in presence of limited proportions of water, and regulating the temperature so as to obtain substantially all of the silicate in the hydrated or water-soluble form.

3. The process of treating silicates for the manufacture of purifying-agents, which consists in calcining the silicate with exclusion of air, reacting on the calcined product with sulfuric and hydrochloric acids in presence of limited proportions of water, and regulating the temperature so as to obtain substantially all of the silicate in the hydrated or water-soluble form.

4. A process for manufacturing a substance for purifying waste water, consisting therein that mineral silicic acid compounds, such as silicates of aluminium are calcined with exclusion of air and thereafter treated with acid and with water in such limited quantity that the silicic acid is converted into gelatinous form or a form soluble in water, and prevented from being precipitated in the form of sand, the acid and the water being added to the mineral in succession so that the whole quantity of acid is added at first and then the water in such limited quantity as to produce such an increase of temperature that the material solidifies during cooling, the solid purifying material being ground to powder if desired.

5. A process for manufacturing a substance for purifying waste water, consisting therein that mineral silicic acid compounds are calcined with exclusion of air and thereafter treated with sulfuric acid, hydrochloric acid and with water in such limited quantity that the silicic acid is converted into gelatinous form or a form soluble in water and prevented from being precipitated in the form of sand the hydrochloric acid addition being limited to an amount which is small compared with the sulfuric acid addition and made after the sulfuric acid reaction is finished.

6. A silicate product, having substantially all the silicate in the hydrated or water-soluble form, produced by ignition of the silicate in the absence of air, and the treatment of said ignited silicate with acid.

In testimony whereof I affix my signature in presence of two witnesses.

FELIX RICHTER.

Witnesses:
 JEAN GRUND,
 CARL GRUND.